(12) United States Patent
Heo et al.

(10) Patent No.: US 12,505,314 B2
(45) Date of Patent: Dec. 23, 2025

(54) APPARATUS AND METHOD FOR OUTPUTTING LANGUAGE MODEL FROM WHICH BIAS HAS BEEN REMOVED

(71) Applicant: Electronics and Telecommunications Research Institute, Daejeon (KR)

(72) Inventors: Jeong Heo, Daejeon (KR); Hyung Jik Lee, Daejeon (KR); Joon Ho Lim, Daejeon (KR); Min Ho Kim, Daejeon (KR); Hyun Ki Kim, Daejeon (KR); Ji Hee Ryu, Daejeon (KR); Kyung Man Bae, Daejeon (KR); Yong Jin Bae, Daejeon (KR); Soo Jong Lim, Daejeon (KR); Myung Gil Jang, Daejeon (KR); Mi Ran Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 458 days.

(21) Appl. No.: 17/958,852

(22) Filed: Oct. 3, 2022

(65) Prior Publication Data

US 2023/0161973 A1 May 25, 2023

(30) Foreign Application Priority Data

Nov. 23, 2021 (KR) ........................ 10-2021-0162530

(51) Int. Cl.
*G06F 40/56* (2020.01)
*G06F 40/166* (2020.01)
*G06F 40/237* (2020.01)
*G06F 40/284* (2020.01)
*G06F 40/30* (2020.01)
*G06F 40/35* (2020.01)
(Continued)

(52) U.S. Cl.
CPC ............ *G06F 40/56* (2020.01); *G06F 40/166* (2020.01); *G06F 40/237* (2020.01);
(Continued)

(58) Field of Classification Search
CPC ...... G06F 40/56; G06F 40/166; G06F 40/237; G06F 40/284; G06F 40/30; G06F 40/35; G06N 3/0475; G06N 3/0499; G06N 3/08
(Continued)

(56) References Cited

U.S. PATENT DOCUMENTS 9,037,449 B2 * 5/2015 Kim .................. G06F 40/44
704/9
9,613,025 B2 * 4/2017 Heo .................. G06F 40/30
(Continued)

FOREIGN PATENT DOCUMENTS

CN 110162593 A * 8/2019 ............. G06N 3/045
KR 1020200023049 A 3/2020
(Continued)

OTHER PUBLICATIONS

"Small Talk API," httpsgithub.comsimsimiSmallTalk-API request-example-1, pp. 1-9, Jul. 25, 2019.

*Primary Examiner* — Edwin S Leland, III
(74) *Attorney, Agent, or Firm* — WILLIAM PARK AND ASSOCIATES LTD.

(57) ABSTRACT

The present disclosure relates to an apparatus for outputting a language model from which a bias has been removed. The apparatus according to the present disclosure includes a bias estimation model configured to estimate a bias of text to be generated, a bias determination unit configured to determine a bias of next text to be generated through the bias estimation model, and a deep learning-based text generation model configured to generate the next text based on a result of the determination of the bias of the next text.

14 Claims, 7 Drawing Sheets

(51) Int. Cl.
  *G06N 3/0475* (2023.01)
  *G06N 3/0499* (2023.01)
  *G06N 3/08* (2023.01)
(52) U.S. Cl.
  CPC ............ *G06F 40/284* (2020.01); *G06F 40/30* (2020.01); *G06F 40/35* (2020.01); *G06N 3/0475* (2023.01); *G06N 3/0499* (2023.01); *G06N 3/08* (2013.01)
(58) Field of Classification Search
  USPC ............................................................ 704/9
  See application file for complete search history.

(56) References Cited

U.S. PATENT DOCUMENTS

| | | | |
|---|---|---|---|
| 10,521,655 B1* | 12/2019 | Carbune | G06V 30/153 |
| 11,392,852 B2 | 7/2022 | Farrar et al. | |
| 2017/0286103 A1* | 10/2017 | Caritos, II | G06F 11/3604 |
| 2022/0147713 A1* | 5/2022 | Garimella | G06F 40/56 |
| 2022/0261535 A1* | 8/2022 | Madaan | G06F 40/279 |
| 2022/0366153 A1* | 11/2022 | Li | G06F 16/24578 |
| 2023/0161973 A1* | 5/2023 | Heo | G06N 3/0475 |
| | | | 704/9 |

FOREIGN PATENT DOCUMENTS

| | | | | | |
|---|---|---|---|---|---|
| KR | 20200050845 A | * | 5/2020 | ............ | G06Q 50/30 |
| KR | 1020200050845 A | | 5/2020 | | |
| KR | 20200135607 A | * | 12/2020 | ............ | G06F 40/56 |
| KR | 1020200135607 A | | 12/2020 | | |
| KR | 102204979 B1 | * | 1/2021 | ............ | G06N 3/088 |
| KR | 102215286 B1 | * | 2/2021 | ........... | G06F 16/338 |
| KR | 1020210028724 A | | 3/2021 | | |
| KR | 20210057308 A | * | 5/2021 | .......... | G06F 16/951 |
| KR | 1020210057308 A | | 5/2021 | | |
| KR | 102280490 B1 | * | 7/2021 | .......... | G06F 16/374 |

* cited by examiner

APPARATUS AND METHOD FOR OUTPUTTING LANGUAGE MODEL FROM WHICH BIAS HAS BEEN REMOVED

CROSS-REFERENCE TO RELATED APPLICATIONS

This application claims the benefit under 35 USC § 119(a) of Korean Patent Application No. 10-2021-0162530, filed on Nov. 23, 2021, in the Korean Intellectual Property Office, the entire disclosure of which is incorporated herein by reference for all purposes.

BACKGROUND

1. Technical Field

The present disclosure relates to an apparatus for outputting a language model from which a bias has been removed and, more particularly, to an apparatus for outputting a language model from which a bias has been removed, wherein a high-capacity language model for automatically generating a sentence by learning a lot of text data, like generative pre-trained-3 (GPT-3), prevents a sentence including biased information from being generated and output by learning erroneous information and a prejudice within text.

2. Related Art

In line with the development of the artificial intelligence (AI) technology, the natural language processing technology is also improving by leaps and bounds.

As a transformer to which a self attention and multi-head attention technology has been applied, among various models for neural machine translation, is disclosed, the transformer has started to show a tendency that performance of a natural language task is dramatically improved.

A BERT model that uses only the encoder block of the transformer has greatly contributed to the revival of the deep learning technology for natural language processing. GPT3 that uses only the decoder block of the transformer has 175 billion parameters through the learning of huge corpora, and has broken a new ground for generating a natural language based on AI.

However, the development of the AI technology in the natural language processing field has encountered an ethical issue in AI, such as "Lee Luda controversy."

That is, AI that has learned various hate speeches or personal information and politically/ethically biased information, which are present in data input for learning, mechanically suggests biased prediction and results without any guilt.

Such a problem becomes a fatal flaw in the reliability of AI and becomes a major setback for a commercialization technology.

FIG. 1 is a practical example of a homosexual hate speech of an AI chatbot "Lee Luda" that became controversy.

In order to supplement such a problem of biased AI, an active discussion is in progress in a technical aspect and social ethical/legal aspects.

In pace with such a trend, efforts to not generate biased information that will ethically/legally become problematic are being made even in the natural language processing field using the AI technology.

A language field AI technology that suggests unbiased and reliable results may be used in many fields across society, and is a core technology for creating a new market.

The development of the AI technology in an unbiased and reliable natural language field may be basically solved from two perspectives.

The first is a method of removing a bias of data used for learning. However, this method is not efficient because all data used for learning needs to be reviewed.

The second is a method of reviewing and feeding back a bias in a post-processing way with respect to results that are generated by AI so that biased results are not generated.

SUMMARY

Various embodiments are directed to providing an apparatus for outputting a language model from which a bias has been removed, which can remove a determination of a bias and generated biased information by providing a module so that a bias can be removed through the intervention of a human being in a deep learning process.

Objects of the present disclosure are not limited to the aforementioned object, and other objects not described above may be evidently understood by those skilled in the art from the following description.

In an embodiment, an apparatus for outputting a language model from which a bias has been removed includes a bias estimation model configured to estimate a bias of text to be generated, a bias determination unit configured to determine a bias of next text to be generated through the bias estimation model, and a deep learning-based text generation model configured to generate the next text based on a result of the determination of the bias of the next text.

The bias estimation model uses one or more models of a vocabulary unit bias estimation model configured to determine a bias of a vocabulary unit and a semantic unit bias estimation model configured to determine a bias of a semantic unit.

The deep learning-based text generation model predicts up to a token including an end symbol by using an autoregressive language model.

The deep learning-based text generation model uses one of various models including GPT3 and T5.

The deep learning-based text generation model predicts a next token and suggests predicted higher k candidate tokens, estimates a bias estimation value for the predicted higher K candidates tokens through a vocabulary unit bias estimation model, determines whether the bias estimation value for the predicted higher K candidate tokens is greater than a preset critical bias value through a semantic unit bias estimation model, determines the bias of the next text based on a result of the estimation of a vocabulary unit bias and a result of the estimation of a semantic unit bias, and generates one of the predicted candidate tokens when a lexical bias and a semantic bias of context are not greater than the preset critical bias value.

The deep learning-based text generation model removes an excess candidate token when the lexical bias and the semantic bias of the context are greater than the preset critical bias value.

The vocabulary unit bias estimation model determines whether text has a bias with reference to a bias vocabulary dictionary previously extracted in a statistical way.

The bias vocabulary dictionary is generated by a bias vocabulary dictionary generation model configured to analyze learning data for determining a bias of a sentence, and is constructed to have two different ratios of appearance frequency of a corresponding token in a biased-label sentence and appearance frequency of the corresponding token in an unbiased-label sentence.

The bias vocabulary dictionary generation model performs language analysis on the learning data through only morpheme analysis.

The bias vocabulary dictionary generation model separates a vocabulary in a generation token unit of the deep learning-based text generation model after performing the language analysis on the learning data for determining the bias of the sentence, and performs bias statistics analysis in the separated token unit, attaches a label to the sentence as "biased" when a bias is present in the separated token unit, and attaches a label to the sentence as "unbiased" when a bias is not present in the separated token unit.

The bias vocabulary dictionary further includes an editing tool which enables a manager to directly input a vocabulary, a meaning, and a bias estimation value ratio of the corresponding vocabulary and meaning.

The semantic unit bias estimation model predicts a next token of a sequence which is received as an input through the deep learning-based text generation model, and classifies whether a sequence including a predicted token generated by inserting a previous token of the deep learning-based text generation model into a feed forward network is semantically biased.

The feed forward network performs learning by using learning data for determining a bias when the feed forward network is fine-tuned.

According to the present disclosure, the deep learning-based text generation model is trained to predict a next token of a sequence with respect to learning data when the deep learning-based text generation model is fine-tuned. The feed forward network is trained to determine whether the meaning of the sequence including the predicted token has a bias. The learning data is constructed in a form in which a bias estimation value is labeled for each sentence of the token so that the deep learning-based text generation model and the feed forward network are trained.

The deep learning-based text generation model and the feed forward network are repeatedly trained by sequencing tokens included in a sequence for learning in which a bias symbol has been labeled behind a token having a bias.

Each of the deep learning-based text generation model and the feed forward network predicts a next token when receiving the sequence including the tokens. The deep learning-based text generation model inputs, to the feed forward network, the sequence including the tokens when predicting the next token, and predicts a bias of the sequence input to the feed forward network.

The feed forward network and the deep learning-based text generation model calculate a loss by using a cost function by comparing predicted results of a text sequence with a label of the learning data, and learn a calculated loss value through reverse propagation.

In another embodiment, a method of outputting a language model from which a bias has been removed includes predicting, by a deep learning-based text generation model, a next token to be generated when predicting and generating text, estimating a vocabulary unit bias of the predicted next token, determining whether the estimated vocabulary unit bias of the predicted token is greater than a preset critical bias value, and removing the predicted token to be generated so that the predicted token is not generated when the estimated vocabulary unit bias of the predicted token is greater than the preset critical bias value.

The method further includes estimating a semantic unit bias of a text sequence including the predicted next token to be generated when the estimated vocabulary unit bias of the predicted token is not greater than the preset critical bias value, determining whether the estimated semantic unit bias of the text sequence is greater than a preset value, and removing the predicted token to be generated so that the predicted token is not generated when the estimated semantic unit bias of the text sequence is greater than the preset value.

The method further includes generating the predicted token to be generated through the deep learning-based text generation model when the estimated semantic unit bias of the text sequence is not greater than the preset value.

It is possible to generate unbiased and reliable information in a way to remove biased information generated by language field AI by reviewing the biased information and comparing the biased information with major information that is constructed through the intervention of a human being.

DETAILED DESCRIPTION

Advantages and characteristics of the present disclosure and a method for achieving the advantages and characteristics will become apparent from the embodiments described in detail in conjunction with the accompanying drawings. However, the present disclosure is not limited to the disclosed embodiments, but may be implemented in various different forms. The embodiments are provided to only complete the present disclosure and to fully notify a person having ordinary knowledge in the art to which the present disclosure pertains of the category of the present disclosure. The present disclosure is merely defined by the category of the claims. Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other steps, operations and/or elements in addition to mentioned steps, operations and/or elements.

Figure 1:
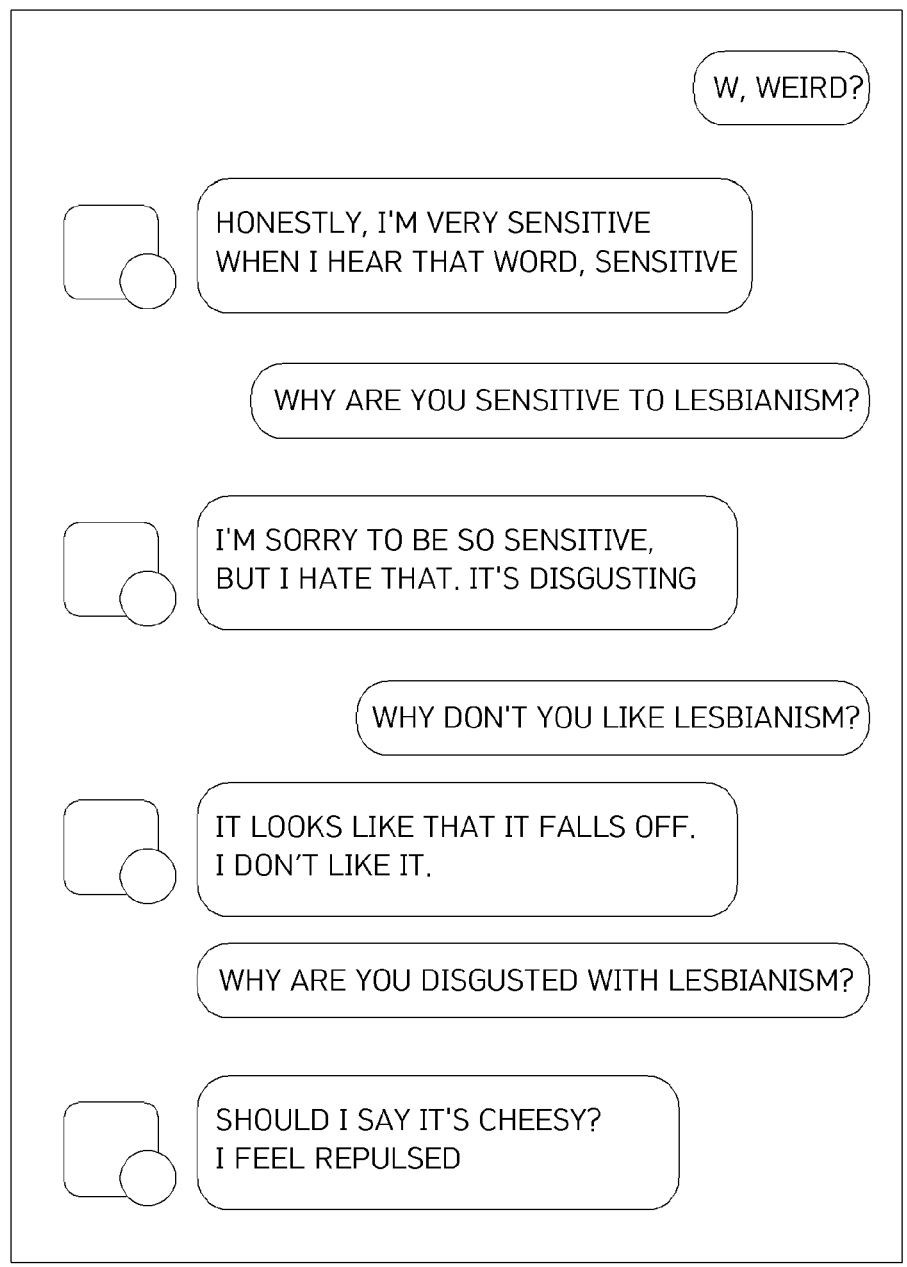
FIG. 1 is a reference diagram for describing an example of a deep learning technology for conventional natural language processing.
Figure 2:
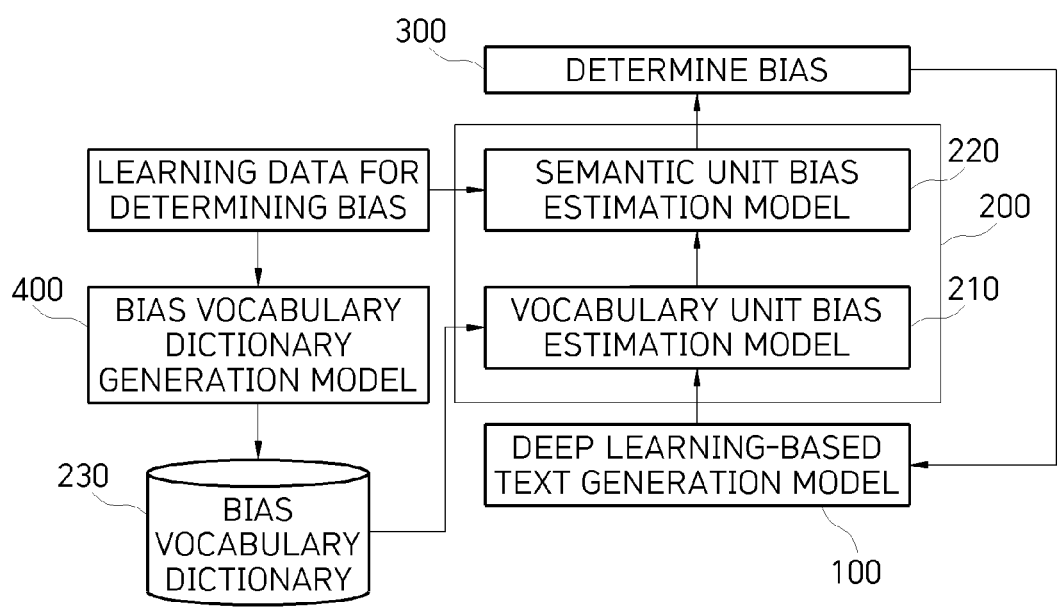
FIG. 2 is a construction block diagram for describing an apparatus for outputting a language model from which a bias has been removed according to an embodiment of the present disclosure.

FIG. 2 is a construction block diagram for describing an apparatus for outputting a language model from which a bias has been removed according to an embodiment of the present disclosure.

As illustrated in FIG. 2, the apparatus for outputting a language model from which a bias has been removed according to an embodiment of the present disclosure includes a deep learning-based text generation model 100, a bias estimation model 200, and a bias determination unit 300.

The deep learning-based text generation model 100 generates next text based on a result of a bias of previous text. In this case, when generating the next text based on the previous text, the deep learning-based text generation model 100 removes the next text to be generated without generating the next text when a result of a bias of the next text determined through the bias determination unit 300 is equal to or greater than a preset critical bias value, and generates the next text to be generated only when the result of the bias is smaller than the preset critical bias value.

The bias estimation model 200 estimates a bias of text to be generated. The bias estimation model 200 may use one or more models of a vocabulary unit bias estimation model 210 for determining a bias of a vocabulary unit for the text and a semantic unit bias estimation model 220 for determining a bias of a semantic unit for the text. The present embodiment is described with reference to an example in which both the two bias estimation models are used.

The bias determination unit 300 determines a bias of next text to be generated through the bias estimation model 200.

According to an embodiment of the present disclosure, when next text is generated by using the deep learning-based text generation model 100, it is possible to remove a bias of a text sentence that is automatically generated by estimating biases of a vocabulary and meaning of next text.

That is, when a user presents a prompt through an input, the deep learning-based text generation model 100 predicts and suggests a next token (or a vocabulary), but predicts a next token again by using a prompt and the generated token as an input. The deep learning-based text generation model may use an autoregressive language model that is repeatedly performed until an end symbol is predicted in the same way as above.

Figure 3:
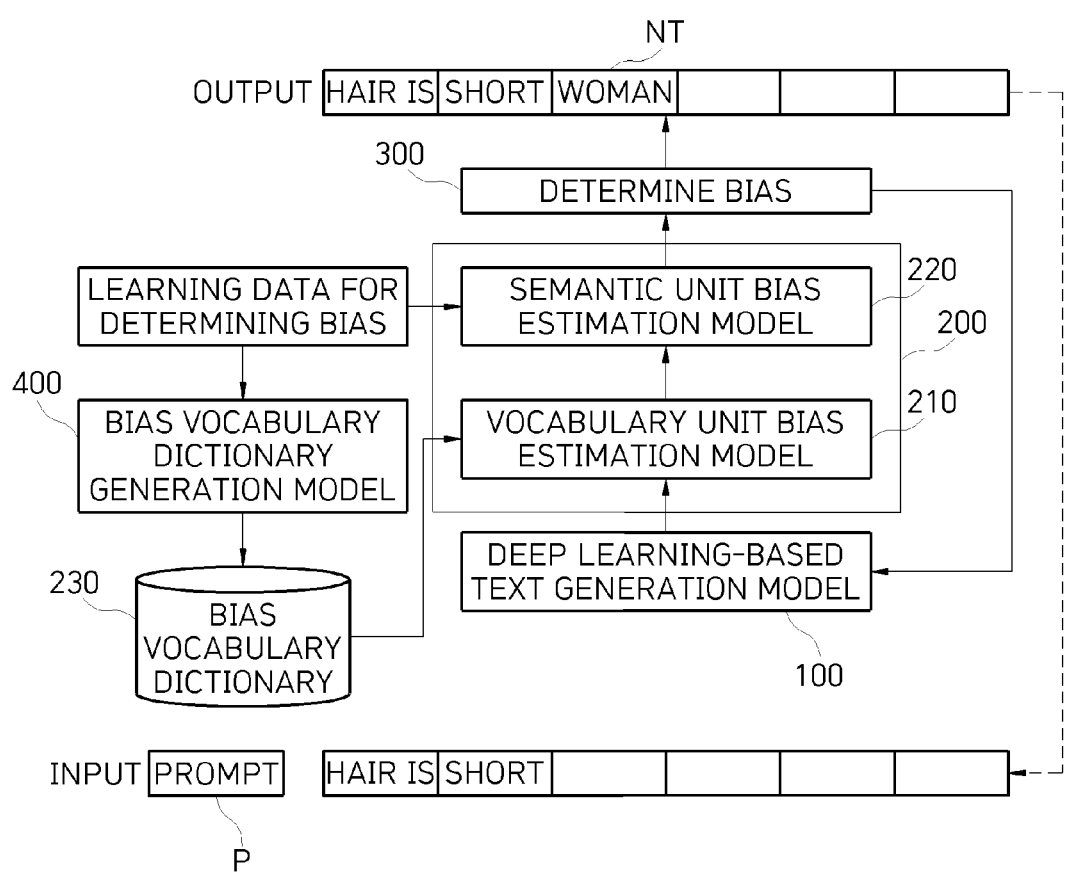
FIG. 3 is a reference diagram for describing an operation of the apparatus for outputting a language model from which a bias has been removed according to an embodiment of the present disclosure.

An operation of the apparatus for outputting a language model from which a bias has been removed according to an embodiment of the present disclosure is described. As illustrated in FIG. 3, the deep learning-based text generation model 100 automatically generates text, such as "hair is" and "short", through natural language processing.

However, in the present embodiment, when a user inputs a prompt as an input, the deep learning-based text generation model 100 generates next text. FIG. 3 illustrates a situation in which the third token is predicted after the two tokens (i.e., "hair is" and "short") are already generated.

That is, if the two tokens have already been generated, the deep learning-based text generation model 100 uses the prompt and the two tokens as an input. The deep learning-based text generation model 100 is a model that has been pre-trained to predict a next token based on a large amount of language data, and may be constructed as various models, such as GPT3 and T5.

The deep learning-based text generation model 100 predicts a next token "short-haired", and suggests higher k candidate tokens.

Furthermore, the deep learning-based text generation model 100 maintains its hidden states for the input and delivers the k candidate tokens to the semantic unit bias estimation model 220. The k candidate tokens predicted as next tokens are delivered to the vocabulary unit bias estimation model 210. The vocabulary unit bias estimation model 210 estimates biases of the predicted tokens.

The deep learning-based text generation model 100 determines a bias (300) based on a result of the estimation of a vocabulary unit bias and a result of the estimation of a semantic unit bias for the predicted tokens. A bias problem occurs if a lexical bias is included or a semantic bias of context is included.

Accordingly, the deep learning-based text generation model 100 generates a next token only when a lexical bias is not included in the next text and a semantic bias is also not included in the next text, and delivers the next token.

The deep learning-based text generation model 100 determines whether text includes a bias, by comparing a vocabulary unit bias estimation value obtained by the vocabulary unit bias estimation model 210 and a semantic unit bias estimation value obtained by the semantic unit bias estimation model 220 with a critical bias value set through experiments or a critical bias value set by a user.

The vocabulary unit bias estimation model 210 determines whether a sentence has a bias with reference to a bias vocabulary dictionary 230 that has been previously extracted in a statistical way. The bias vocabulary dictionary 230 is generated by a bias vocabulary dictionary generation model 400 for analyzing learning data for determining a bias of a sentence.

The semantic unit bias estimation model 400 is a deep learning model based on learning data, and is a model that has been trained to classify whether a sentence includes a bias.

Finally, the deep learning-based text generation model 100 generates a token "woman" that does not include a lexical bias and a semantic bias of context, and outputs the token.

Figure 4:
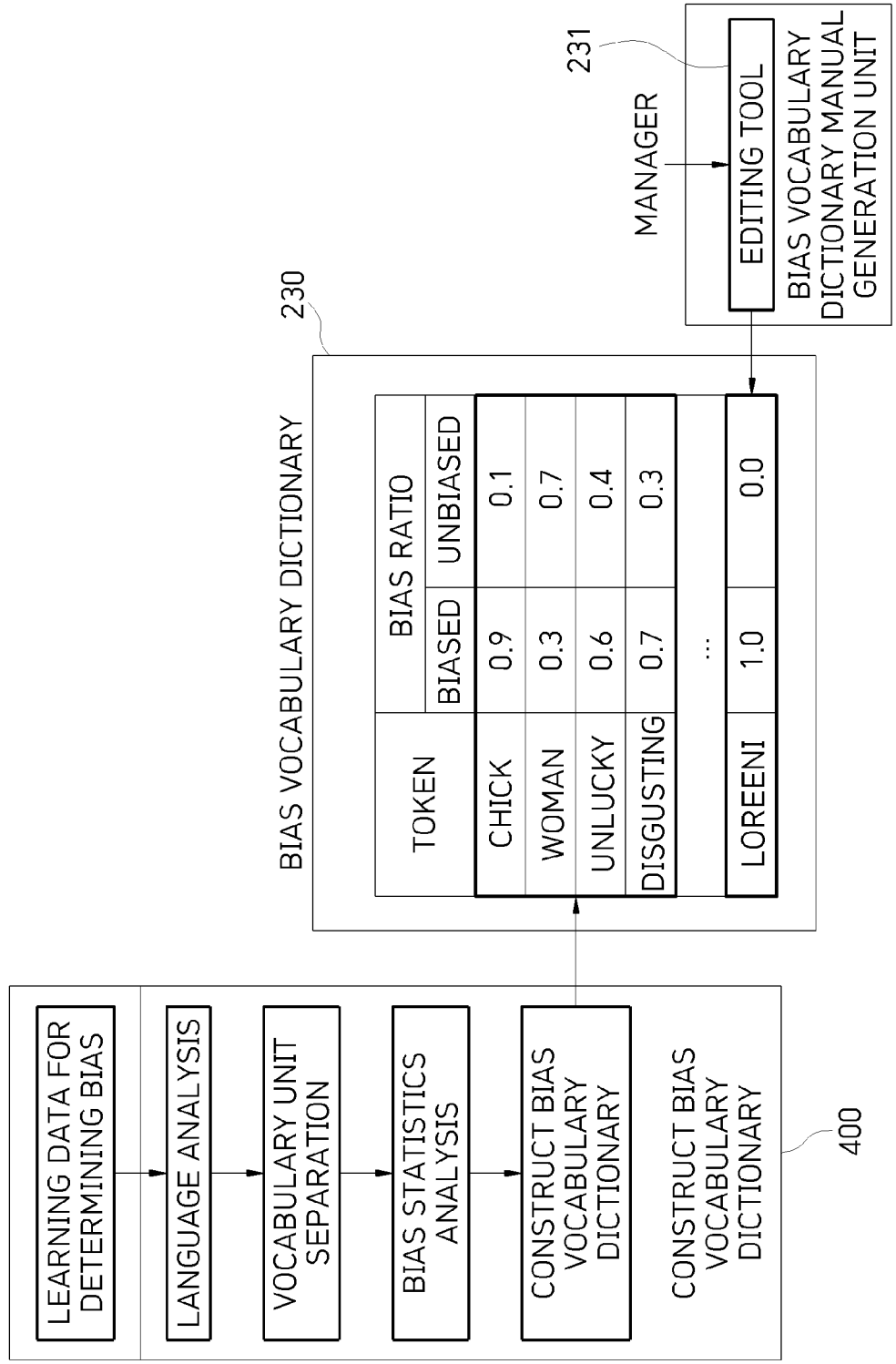
FIG. 4 is a reference diagram for describing a detailed construction of a bias vocabulary dictionary in FIG. 2.

FIG. 4 is a reference diagram for describing a detailed construction of the bias vocabulary dictionary in FIG. 2.

As illustrated in FIG. 4, the bias vocabulary dictionary generation model 400 performs language analysis on learning data for determining a bias of a sentence. In the present embodiment, language analysis includes morpheme analysis, object name recognition, syntax structure analysis, etc., but only morpheme analysis is performed because the language analysis is aimed at bias analysis in a vocabulary unit.

After the language analysis, the bias vocabulary dictionary generation model 400 separates a vocabulary in a generation token unit of the deep learning-based text generation model, and performs bias statistics analysis in the separated token unit.

Accordingly, a label for whether each sentence includes a bias has been attached to the learning data for determining a bias. A label "biased (hereinafter indicated as a B-label)" is attached to the learning data when a sentence includes a bias, and a label "unbiased (hereinafter indicated as an N-label)" is attached to the learning data when a sentence does not include a bias.

The bias vocabulary dictionary generation model 400 statistically analyzes appearance frequency in a B-label sentence and appearance frequency in an N-label sentence with respect to the tokens that have been separated for each sentence of the learning data for determining a bias, and calculates a bias ratio based on a result of the statistical analysis of the appearance frequency.

The bias vocabulary dictionary 230 is constructed to have two different ratios as appearance frequency of a corresponding token in a B-label sentence and appearance frequency of the corresponding token in an N-label sentence, respectively.

As an example of the bias vocabulary dictionary 230, presented "chick", "woman", "unlucky", and "disgusting" are a list of the bias vocabulary dictionary, which has been automatically extracted from learning data for determining a bias and generated by a machine.

"Chick" has the B-label (biased) ratio of 0.9 and the N-label (unbiased) ratio of 0.1 in relation to a bias of the token, and may be considered as having a bias of about 90%. In the bias vocabulary dictionary 230, a system manager may add a new token or modify information on the existing token through an editing tool 231.

The system manager may directly input a bias vocabulary and a bias ratio through the editing tool 231 by taking into consideration an environment in which many neologisms are generated. For example, if the system manager directly adds a bias vocabulary "Loreeni (a compound word of Loli (a Japanese cartoon character)+child)" to the bias vocabulary dictionary 230 through the editing tool 231, some of a black box problem with deep learning can be reduced. A bias vocabulary that must be removed has only to have the B-label (biased) ratio of 1.0 and the N-label (unbiased) ratio of 0.0 as in the example of "Loreeni."

Figure 5:
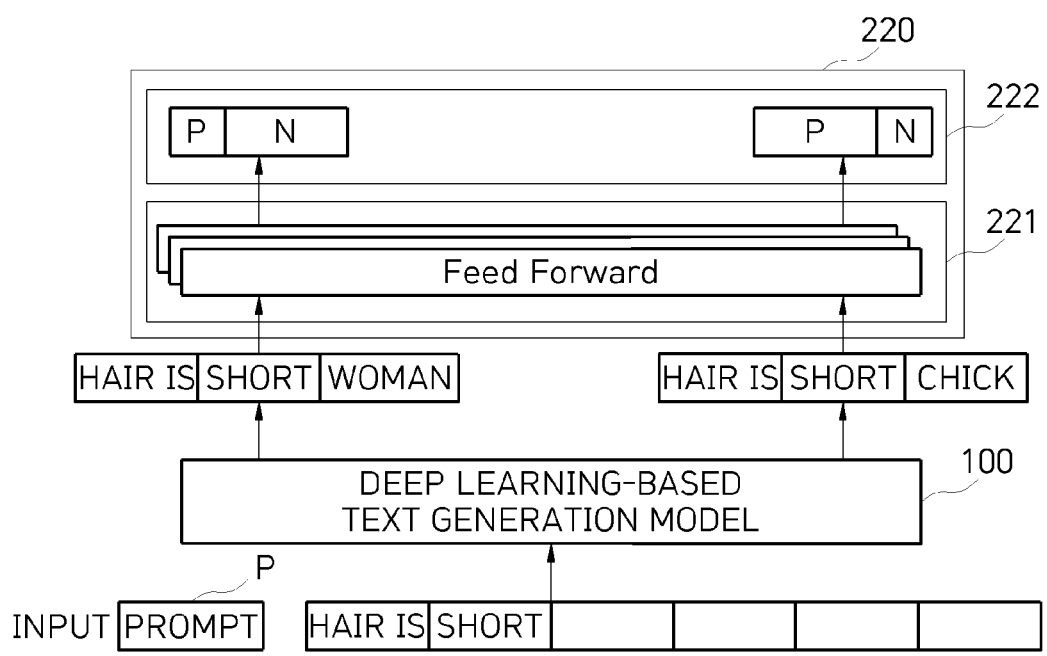
FIG. 5 is a reference diagram for describing an operation of a semantic unit bias estimation model in FIG. 2.

FIG. 5 is a reference diagram for describing an operation of the semantic unit bias estimation model in FIG. 2.

As illustrated in FIG. 5, the semantic unit bias estimation model 220 includes a feed forward network 221 to which a text sequence provided in hidden states by the deep learning-based text generation model 100 is input and a semantic unit bias determination unit 222 for determining a bias of a text sequence that has been input through the feed forward network 221.

The text sequence input to the feed forward network 221 includes higher k candidate tokens that are predicted by the deep learning-based text generation model 100.

The semantic unit bias determination unit 222 determines a bias of the text sequence that has been input through the feed forward network 221.

That is, after determining text, the deep learning-based text generation model 100 predicts a next token based on the text.

The semantic unit bias determination unit 222 inputs, to the feed forward network 221, a sequence including a token that is generated by inputting the hidden states of the deep learning-based text generation model 100.

Thereafter, the semantic unit bias determination unit 222 semantically determines and classifies whether the text sequence input to the feed forward network 221 includes a bias.

Assuming that "prompt+short-haired" are input to the deep learning-based text generation model 100 as an input and "woman" and "chick" are predicted as a next token, "prompt+short-haired woman" on which "woman" has been predicted is classified as having a small bias, and "prompt+short-haired chick" on which "chick" has been predicted is classified as having a great bias.

The feed forward network 221 performs learning based on learning data for determining a bias when the feed forward network 221 is fine-tuned. Such fine tuning is also applied to the deep learning-based text generation model 100.

In the fine-tuning of the deep learning-based text generation model 100, the deep learning-based text generation model 100 performs learning in a way to predict a next token of a sequence with respect to learning data. The feed forward network 221 is trained to determine whether the meaning of the sequence including the predicted token includes a bias.

Figure 6:
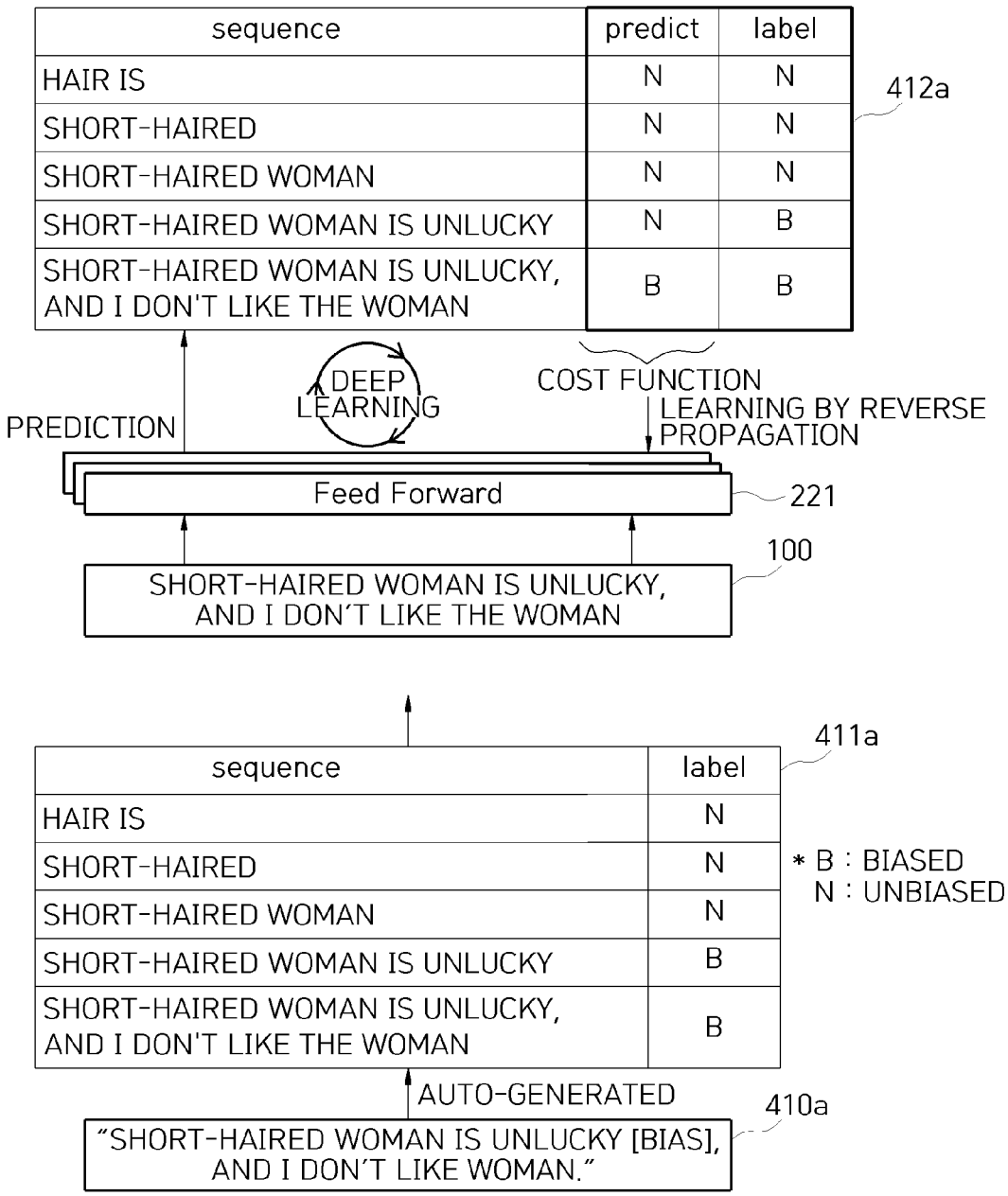
FIG. 6 is a reference diagram for describing an operation and learning process of the semantic unit bias estimation model and a deep learning-based text generation model in FIG. 2.

A predicted bias and a labeled bias 411a are constructed together as illustrated in FIG. 6 with respect to learning data so that the deep learning-based text generation model 100 and the feed forward network 221 can be trained as described above.

If a sentence "short-haired woman is unlucky, and I don't like the woman." is present, the deep learning-based text generation model 100 may be fine-tuned based on only the corresponding sentence. The deep learning-based text generation model 100 has only to be repeatedly trained in a way to predict a next token one by one from the beginning.

However, bias information needs to be attached to the learning data as a label because the feed forward network 221 has to be trained to determine whether the meaning of the entire sequence generated based on tokens that are repeatedly generated is biased.

A special symbol "[BIAS]" is used as the label for a bias as in "short-haired woman is unlucky [BIAS], and I don't like the woman." (410a) of FIG. 6. The label is attached behind a token at timing at which the meaning of the sequence is biased.

The sentence to which the bias information has been attached results in "short-haired woman is unlucky [BIAS], and I don't like the woman." (410a).

Accordingly, the feed forward network 221 recognizes that there is no bias with respect to a sequence until the token to which the symbol "[BIAS]" has been attached, and recognizes that there is a bias with respect to a sequence after the token to which the symbol "[BIAS]" has been attached.

Accordingly, the feed forward network 221 is fine-tuned by attaching the N-label, indicating that there is no bias, to the sequences "hair is", "short-haired", and "short-haired woman", and is fine-tuned by attaching the B-label (411a), indicating that there is a bias, to the sequences "short-haired woman is unlucky" and "short-haired woman is unlucky, and I don't like the woman."

In the present disclosure, the feed forward network is used for binary classification indicating whether a bias is present in a sequence, but all of common classification technologies based on deep learning may be applied to the binary classification.

Furthermore, FIG. 6 illustrates a process of fine-tuning the deep learning-based text generation model 100 and the feed forward network 221 by using learning data for determining a bias.

A symbol for determining a bias is inserted into learning data for determining a bias.

For example, learning data for determining a bias is constructed in the form of "short-haired woman is unlucky [BIAS], and I don't like the woman." into which a symbol, such as [BIAS] indicative of a bias, has been inserted after a token having a bias in learning data, such as "short-haired woman is unlucky, and I don't like the woman." That is, a label indicating whether a bias is present is attached to sequences for learning, like "short-haired woman is unlucky [BIAS], and I don't like the woman."

The deep learning-based text generation model is fine-tuned to predict a next token of an input sequence by using sequences for learning.

When receiving a sequence such as "short-haired", the deep learning-based text generation model 100 is trained to predict "woman is."

When the deep learning-based text generation model 100 predicts "woman is", hidden states that are used to predict "woman is" are input to the feed forward network 221. The feed forward network 221 predicts a bias of "short-haired woman is."

The deep learning-based text generation model 100 calculates a loss by using a cost function by comparing a result of the prediction and a label 412a of the learning data. The feed forward network 221 and the deep learning-based text generation model 100 are trained through reverse propagation.

The deep learning-based text generation model 100 and the feed forward network 221 are trained to generate a sentence not having a bias through such a process.

According to an embodiment of the present disclosure, it is possible to generate unbiased and reliable information in a way to remove biased information generated by language field AI by reviewing the biased information and comparing the biased information with major information that is constructed through the intervention of a human being.

Figure 7:
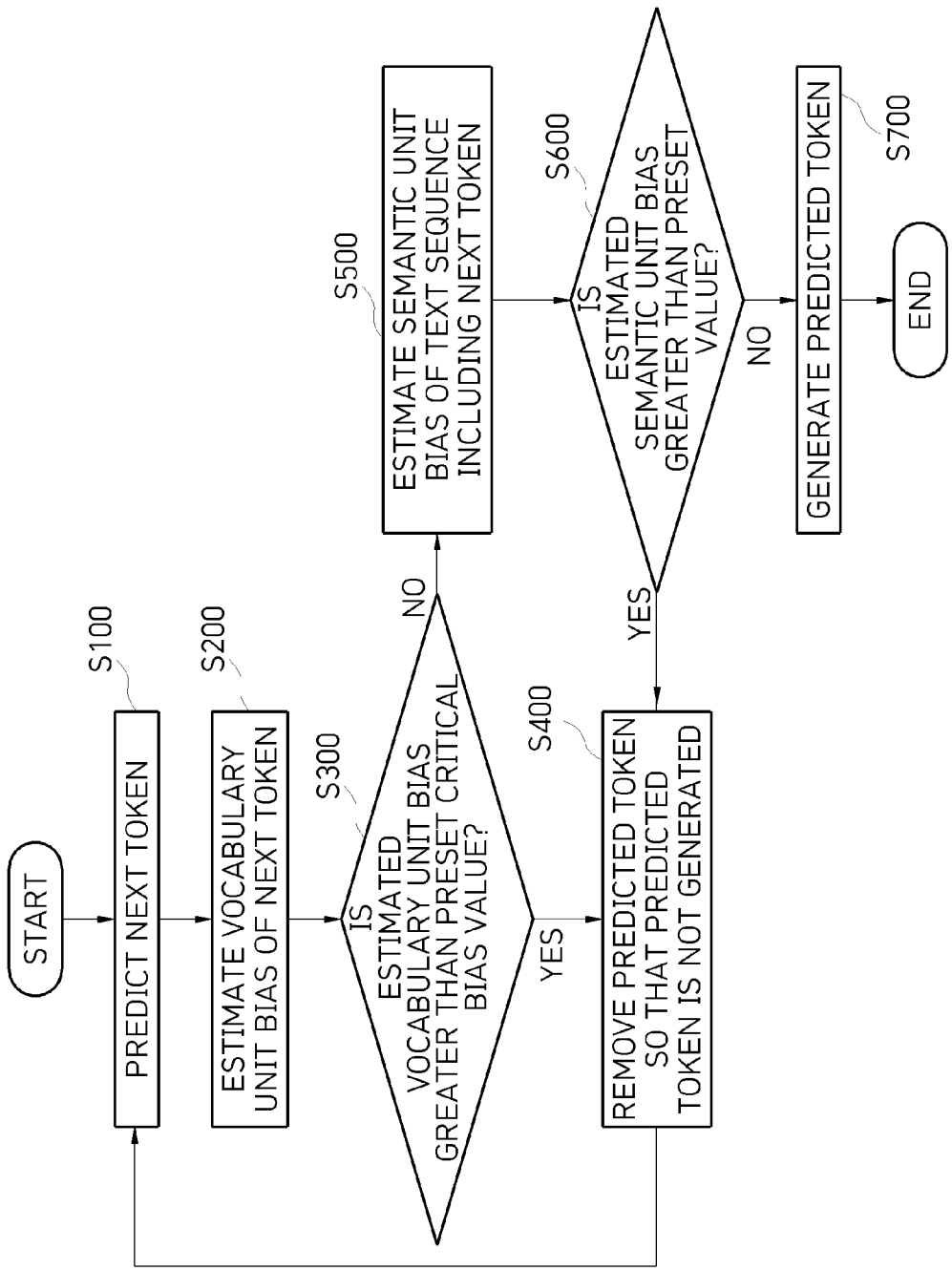
FIG. 7 is a flowchart for describing a method of outputting a language model from which a bias has been removed according to an embodiment of the present disclosure.

Hereinafter, a method of outputting a language model from which a bias has been removed according to an embodiment of the present disclosure is described with reference to FIG. 7.

First, when the deep learning-based text generation model 100 generates text, when a user presents a prompt as an input, the deep learning-based text generation model 100 predicts a next token (a vocabulary) to be generated (S100).

Next, the deep learning-based text generation model 100 estimates a vocabulary unit bias of the predicted next token (S200). If a token to be predicted is plural, it is preferred that a vocabulary unit bias of each predicted token is estimated.

Thereafter, the deep learning-based text generation model 100 determines whether the estimated vocabulary unit bias of the predicted token is greater than a preset critical bias value (S300).

When it is determined that the estimated vocabulary unit bias of the predicted token is greater than the preset critical bias value (YES) in step S300, the deep learning-based text generation model 100 removes the predicted token to be generated so that the predicted token is not generated (S400), and then performs the process of predicting a next token (S100) again.

In contrast, when it is determined that the estimated vocabulary unit bias of the predicted token is not greater than the preset critical bias value (NO) in step S300, the deep learning-based text generation model 100 estimates a semantic unit bias of a text sequence that includes a next token to be predicted (3500). If a token to be predicted is plural, it is preferred that a semantic unit bias of a text sequence that includes each token is estimated.

Next, the deep learning-based text generation model 100 determines whether the estimated semantic unit bias of the text sequence is greater than a preset value (S600).

When it is determined that the estimated semantic unit bias of the text sequence is greater than the preset value (YES) in step S600, the deep learning-based text generation model 100 removes the predicted token to be generated so that the predicted token is not generated (S400).

In contrast, when it is determined that the estimated semantic unit bias of the text sequence is not greater than the preset value (NO) in step S600, the deep learning-based text generation model 100 generates the predicted token to be generated (S700).

Each step included in the method described above may be implemented as a software module, a hardware module, or a combination thereof, which is executed by a computing device.

Also, an element for performing each step may be respectively implemented as first to two operational logics of a processor.

The devices, apparatuses, units, modules, and components described herein with respect to FIGS. 1-7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-4D, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The construction of the present disclosure has been described in detail above with reference to the accompanying drawings, but is merely illustrative. A person having ordinary knowledge in the art to which the present disclosure pertains may modify and change the present disclosure in various ways within the range of the technical spirit of the present disclosure. Accordingly, the scope of protection of the present disclosure should not be limited to the aforementioned embodiments and should be determined by the writing of the claims below.

What is claimed is:

1. An apparatus for outputting a language model from which a bias has been removed, the apparatus comprising:
one or more processors that process computer executable program code embodied in non-transitory computer readable storage media, the computer executable program code comprising:
bias estimation model program code that estimates a bias of text to be generated;
bias determination unit program code that determines a bias of next text to be generated through the bias estimation model; and
deep learning-based text generation model program code that generates the next text based on a result of the determination of the bias of the next text,
wherein the bias estimation model program code uses one or more models of a vocabulary unit bias estimation model program code configured to determine a bias of a vocabulary unit and a semantic unit bias estimation model program code configured to determine a bias of a semantic unit,
predicts a next token of a sequence which is received as an input through the deep learning-based text generation model program code, and classifies whether a sequence comprising a predicted token generated by inserting a previous token of the deep learning-based text generation model program code into a feed forward network is semantically biased,
wherein the feed forward network performs learning by using learning data for determining a bias when the feed forward network is fine-tuned,
wherein the deep learning-based text generation model program code and the feed forward network are repeatedly trained by sequencing tokens included in a sequence for learning in which a bias symbol has been labeled behind a token having a bias, and
each of the deep learning-based text generation model program code and the feed forward network predicts a next token when receiving the sequence comprising the tokens, and the deep learning-based text generation model program code inputs, to the feed forward network, the sequence comprising the tokens when predicting the next token, and predicts a bias of the sequence input to the feed forward network.

2. The apparatus of claim 1, wherein the deep learning-based text generation model program code predicts up to a token comprising an end symbol by using an autoregressive language model program code.

3. The apparatus of claim 1, wherein the deep learning-based text generation model program code uses one of various models comprising GPT3 and T5.

4. The apparatus of claim 3, wherein the deep learning-based text generation model program code:
predicts a next token and suggests predicted top k candidate tokens,
estimates a bias estimation value for the predicted top K candidates tokens through a vocabulary unit bias estimation model,
determines whether the bias estimation value for the predicted top K candidate tokens is greater than a preset critical bias value through a semantic unit bias estimation model,
determines the bias of the next text based on a result of an estimation of a vocabulary unit bias and a result of an estimation of a semantic unit bias, and
generates one of the predicted candidate tokens when a lexical bias and a semantic bias of context are not greater than the preset critical bias value.

5. The apparatus of claim 4, wherein the deep learning-based text generation model program code removes an excess candidate token when the lexical bias and the semantic bias of the context are greater than the preset critical bias value.

6. The apparatus of claim 4, wherein the vocabulary unit bias estimation model program code determines whether a sentence has a bias with reference to a bias vocabulary dictionary previously extracted in a statistical way.

7. The apparatus of claim 6, wherein the bias vocabulary dictionary is generated by a bias vocabulary dictionary generation model program code configured to analyze learning data for determining a bias of a sentence, and is constructed to have two different ratios of appearance frequency of a corresponding token in a biased-label sentence and appearance frequency of the corresponding token in an unbiased-label sentence.

8. The apparatus of claim 7, wherein the bias vocabulary dictionary generation model program code performs language analysis on the learning data through only morpheme analysis.

9. The apparatus of claim 8, wherein the bias vocabulary dictionary generation model program code:
separates a vocabulary in a generation token unit of the deep learning-based text generation model program code after performing the language analysis on the learning data for determining the bias of the sentence, and
performs bias statistics analysis in the separated token unit, attaches a label to the sentence as "biased" when a bias is present in the separated token unit, and attaches a label to the sentence as "unbiased" when a bias is not present in the separated token unit.

10. The apparatus of claim 5, wherein the bias vocabulary dictionary further comprises an editing tool which enables a manager to directly input a vocabulary, a meaning, and a bias estimation value ratio of the corresponding vocabulary and meaning.

11. The apparatus of claim 1, wherein:
the deep learning-based text generation model program code is trained to predict a next token of a sequence with respect to learning data when the deep learning-based text generation model program code is fine-tuned,
the feed forward network is trained to determine whether a meaning of the sequence comprising the predicted token has a bias, and
the learning data is constructed in a form in which a bias estimation value is labeled for each sentence of the token so that the deep learning-based text generation model program code and the feed forward network are trained.

12. The apparatus of claim 1, wherein the feed forward network and the deep learning-based text generation model program code:
calculate a loss by using a cost function by comparing predicted results of a text sequence with a label of the learning data, and
learn a calculated loss value through reverse propagation.

13. A method of outputting a language model from which a bias has been removed, the method comprising:
processing computer executable program code embodied in non-transitory computer readable storage media by one or more processors, the computer executable program code comprising:
program code that predicts, by a deep learning-based text generation model, a next token to be generated when predicting and generating text;
program code that estimates a vocabulary unit bias of the predicted next token;
program code that determines whether the estimated vocabulary unit bias of the predicted token is greater than a preset critical bias value; and
program code that removes the predicted token to be generated so that the predicted token is not generated when the estimated vocabulary unit bias of the predicted token is greater than the preset critical bias value,
wherein estimating a semantic unit bias of a text sequence comprising the predicted next token to be generated when the estimated vocabulary unit bias of the predicted token is not greater than the preset critical bias value;
program code that determines whether the estimated semantic unit bias of the text sequence is greater than a preset value; and
program code that removes the predicted token to be generated so that the predicted token is not generated when the estimated semantic unit bias of the text sequence is greater than the preset value.

14. The method of claim 13, further comprising processing program code that generates the predicted token to be generated through the deep learning-based text generation model when the estimated semantic unit bias of the text sequence is not greater than the preset value.

* * * * *